US006982616B2

(12) United States Patent  
Nakanishi et al.

(10) Patent No.: US 6,982,616 B2  
(45) Date of Patent: Jan. 3, 2006

(54) SWITCH WITH CURRENT POTENTIAL CONTROL

(75) Inventors: Yoshito Nakanishi, Tokyo (JP); Norisato Shimizu, Kanagawa (JP); Kunihiko Nakamura, Kanagawa (JP); Yasuyuki Naito, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 19 days.

(21) Appl. No.: 10/624,381

(22) Filed: Jul. 22, 2003

(65) Prior Publication Data

US 2004/0124945 A1    Jul. 1, 2004

(30) Foreign Application Priority Data

Jul. 26, 2002   (JP)   ............................. 2002-217872  
Jul. 26, 2002   (JP)   ............................. 2002-217873  
Jun. 27, 2003   (JP)   ............................. 2003-184204

(51) Int. Cl.  
*H01H 51/22*    (2006.01)

(52) U.S. Cl. ........................................ 335/78; 200/181  
(58) Field of Classification Search ................ 335/78; 200/181; 333/101, 105, 262  
See application file for complete search history.

(56) References Cited

U.S. PATENT DOCUMENTS

| 4,979,149 | A  | * | 12/1990 | Popovic et al. ............ 365/244 |
| 6,020,564 | A  | * | 2/2000  | Wang et al. ................. 200/181 |
| 6,218,911 | B1 | * | 4/2001  | Kong et al. ................. 333/101 |
| 6,307,452 | B1 | * | 10/2001 | Sun ............................. 333/262 |
| 6,727,778 | B2 | * | 4/2004  | Kudrle et al. ................. 333/33 |
| 2003/0210115 | A1 | * | 11/2003 | Kubby et al. ................. 335/78 |
| 2004/0070310 | A1 | * | 4/2004  | Ollier et al. ................. 310/309 |

FOREIGN PATENT DOCUMENTS

DE        199 37 811 A      3/2001

OTHER PUBLICATIONS

European Search Report for EP 03 01 6858, dated Jan. 21, 2004.

* cited by examiner

*Primary Examiner*—Lincoln Donovan  
*Assistant Examiner*—Bernard Rojas  
(74) *Attorney, Agent, or Firm*—RatnerPrestia

(57) ABSTRACT

A switch comprises voltage applying means for providing direct current potentials to first to third beams arranged with a spacing slightly distant one from another, and electrodes for inputting/outputting signals to/from the beams. By controlling the direct current potential provided to the beam, an electrostatic force is caused to thereby change the beam positions and change a capacitance between the beams. By causing an electrostatic force between the first and second beams and moving the both beams, the first and second beams can be electrically coupled together at high speed. Also, an electrostatic force is caused on the third beam arranged facing to the first and second beams, to previously place it close to the first and second beams. When the electrostatic force is released from between the first and second beams, the second beam moves toward the third beam thereby releasing the first and second beams of an electric coupling.

23 Claims, 13 Drawing Sheets

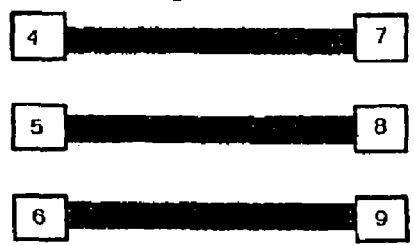
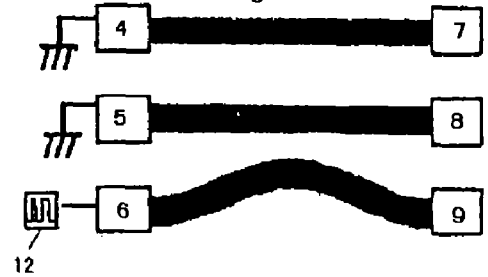
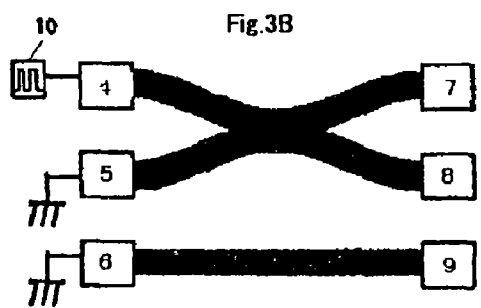
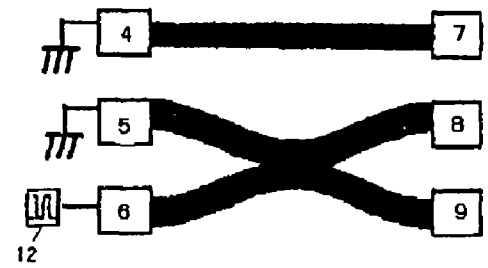
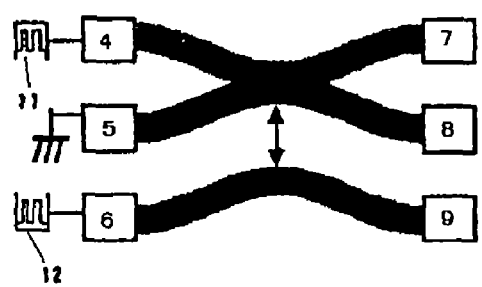
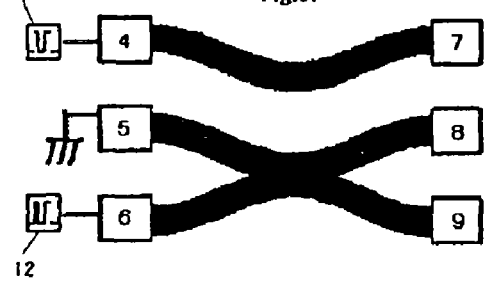

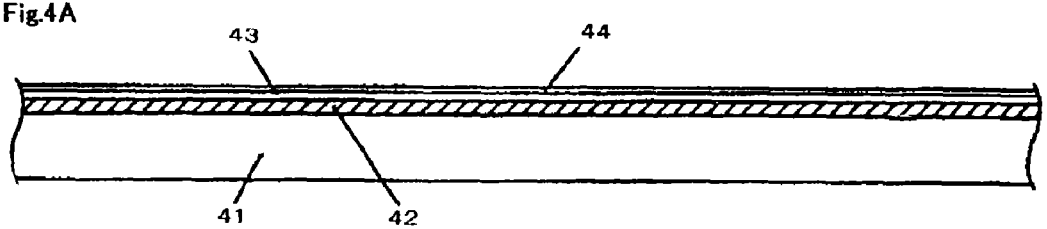
Fig.4A
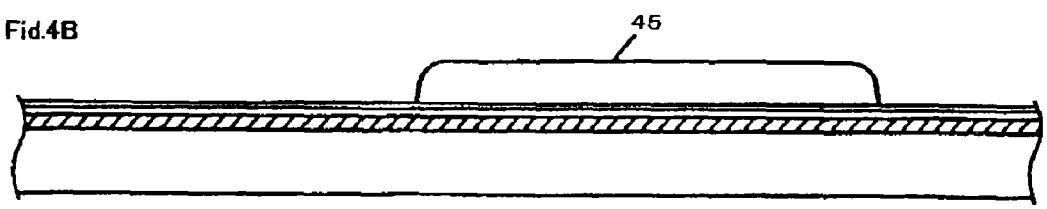
Fid.4B
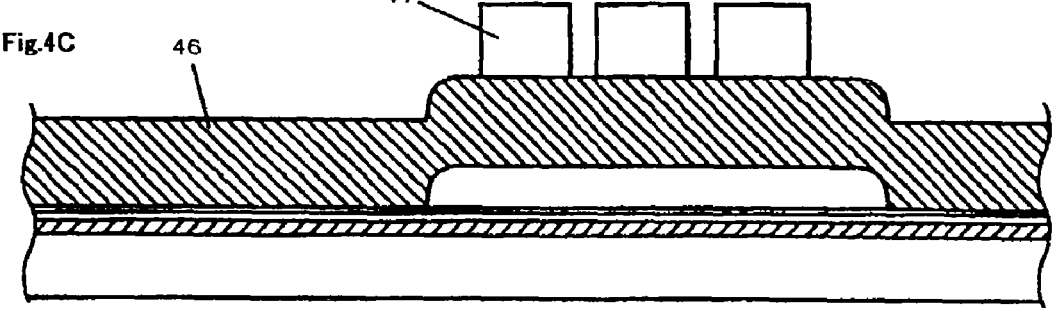
Fig.4C
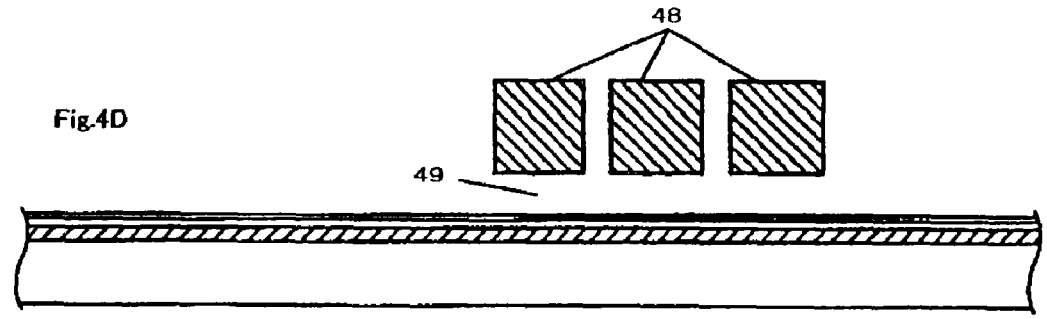
Fig.4D
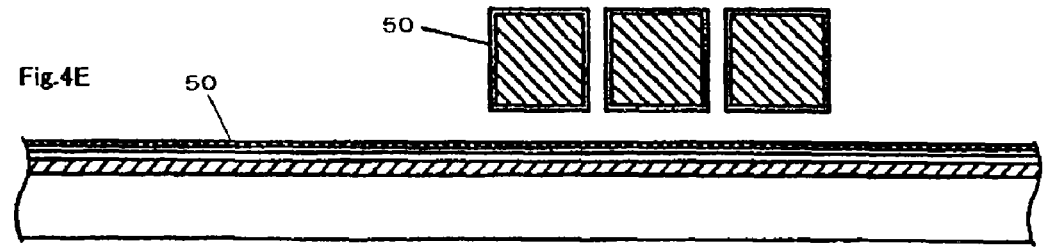
Fig.4E
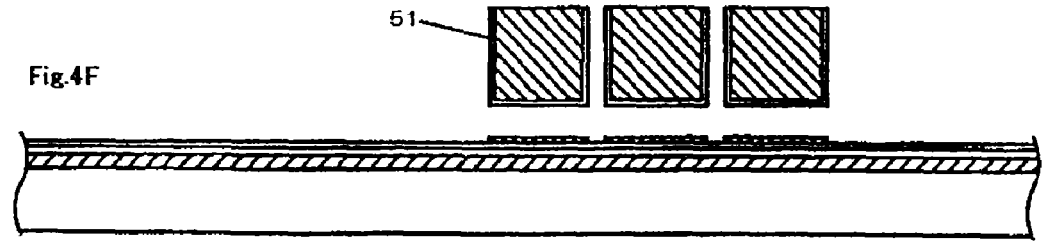
Fig.4F

SWITCH WITH CURRENT POTENTIAL CONTROL

FIELD OF THE INVENTION

This invention relates to a switch, for use on an electric circuit, having an electrode to be mechanically moved by an externally applied force, to thereby pass or cut off the signal.

BACKGROUND OF THE INVENTION

Conventionally there is known, as a switch for use on an electric circuit, a switch using an air bridge described in U.S. Pat. No. 6,218,911. In this structure, a movable air bridge is arranged between a pair of electrodes formed on a substrate. In case an electrostatic force is given between the electrode and the movable air bridge, the air bridge horizontally moves toward the electrode into a contact with one electrode but isolated from the other electrode. Accordingly, in case a signal is inputted to the air bridge, the air bridge is electrically connected with the one electrode, allowing a signal to pass. However, the signal is cut off at the other electrode, thus enabling switch operation.

Meanwhile, a micro-electromechanical RF switch is known which is described in U.S. Pat. No. 6,307,452. The micro-electromechanical RF switch has a plurality of folded spring suspension devices on a substrate, on which a micro-platform is suspended. Beneath the micro-platform, a signal line is formed. When a direct current potential is applied between the signal line and the micro-platform, an electrostatic force is caused to attract the micro-platform toward the signal line, thus effecting switch-on.

However, in the structure of U.S. Pat. No. 6,218,911, in the case of driving the air bridge on an electrostatic force, realizing greater signal isolation requires to increase the spacing between the electrode and the air bridge. However, because electrostatic force is proportional to a negative square of distance, electrostatic force decreases and makes it impossible for response time to attain a desired value. Meanwhile, there is an approach to increase the application voltage in order to compensate for the decrease of electrostatic force. However, application voltage increase is not preferred for the radio communication device requiring low power consumption and low drive voltage.

Meanwhile, because the air bridge is of a straight-beam structure, tensile stress if exists within the beam increases the rigidity against electrostatic force just like a strongly stretched cord, raising a pull-in voltage (pull-in voltage due to electrostatic force). Furthermore, at an elevated temperature, beam internal stress turns into compression, possibly causing buckling. Namely, unless the residual stress resulting from a manufacture process or environmental temperature upon switch operation can be controlled constant, stable switch operation characteristic cannot be guaranteed.

On the other hand, the micro-platform structure in U.S. Pat. No. 6,307,452 is divided with a region for coupling to a signal line and a folded spring-suspension structure part (flexure) for relaxing stress. Namely, an additional structure is provided to relax internal stress. As apparent from Newton's laws of motion, in the case of applying the same force to a structure having a mass m, the acceleration occurring on the structure is greater as the mass m is smaller. For this reason, the above structure involves the problem that, because of addition of the flexure, the mass m is increased to make it impossible to increase the response speed. Meanwhile, as the flexure is softer, the platform is relaxed in binding at its supports. Consequently, in case there exists a stress gradient in a direction of film thickness, the platform warps up due to stress release and separates off the substrate. Unless the stress gradient value cannot be accurately reproduced in the beam manufacture process, the degree of warpage varies, making it impossible to suppress the variation in capacitance reduction between a platform and a signal line and the variation in pull-in voltage increase. Meanwhile, the manufacture with using a semiconductor process makes a beam and a flexure structure into the same material of conductors. In a radio frequency circuit, the flexure part thereof has an non-negligible impedance.

Meanwhile, where the environmental temperature changes, thermal stress takes place due to a difference of thermal expansion coefficient between the base material and the beam material. Although the thermal stress is different in occurrence cause from the foregoing residual stress encountered in manufacture process, it triggers a phenomenon of the similar "strain in the beam due to stress release". Accordingly, it must be taken into account of an effect upon capacitance or pull-in voltage.

SUMMARY OF THE INVENTION

The present invention has been made in view of the foregoing points, and it is an object thereof to provide a switch capable of realizing to shorten response time and reduce application voltage.

Also, another object is to provide a switch capable of realizing a switch free of a variation in pull-in voltage increase.

Also, another object is to provide a switch capable of suppressing the change of switch characteristic due to a beam internal stress change.

A switch of the present invention is structured by first, second and third beams arranged with spacing slightly distant one from another, voltage applying means for independently providing the beams with direct current potentials to apply an electrostatic force to the beam, and electrodes provided on the beams and to input/output an alternating current signal to/from the beam whereby the beams are changed in position by the electrostatic force and changed in the capacitance between the beams.

According to this structure, an electrostatic force is caused between the first and second beams to thereby move both of the first and second beams so that the beams can be coupled together at high speed and put off at high speed. By causing an electrostatic force on the third beam arranged facing to the second beam and previously placing it close to the first and second beams, a strong electrostatic force can be applied between the second and third beams, enabling to make a response at higher speed.

Also, in the invention, by providing the beams with the same form of bending, it is possible to relax a pull-in voltage change against a beam internal stress change and also a beam-to-beam capacitance change due to beam strain.

This makes it possible to structure a ultra-small-sized variable capacitive switch which is to be driven at high speed on low voltage and reduced in the characteristic change due to residual stress or thermal expansion, by the use of a semiconductor thin-film process.

BRIEF DESCRIPTION OF THE DRAWINGS

FIG. 2A is a switch connection circuit diagram according to embodiment 1 of the invention while

FIGS. 3A–3F are a concept view explaining the operation of the switch of embodiment 1 of the invention;

FIGS. 4A–4F are a sectional view showing one example of a process to manufacture a switch of embodiment 1 of the invention;

FIG. 8A is a perspective view showing a schematic structure of a switch according to embodiment 4 of the invention while

DESCRIPTION OF THE EXEMPLARY EMBODIMENT

Exemplary embodiments of the present invention are demonstrated hereinafter with reference to the accompanying drawings.

The present invention has a gist to realize, in a switch having three beams to be changed in relative positions so that the capacitance can be changed between the beams, to provide electric coupling and decoupling, a structure that high-speed switching and low direct-current control is made possible by making the beams all movable.

Meanwhile, the present structure aims at relaxing the pull-in voltage change against a beam internal stress, to relax also the beam-to-beam capacitance change resulting from beam strain, by constructing the beams forming the switch by a flexure structure.

1. First Exemplary Embodiment

Figure 1:
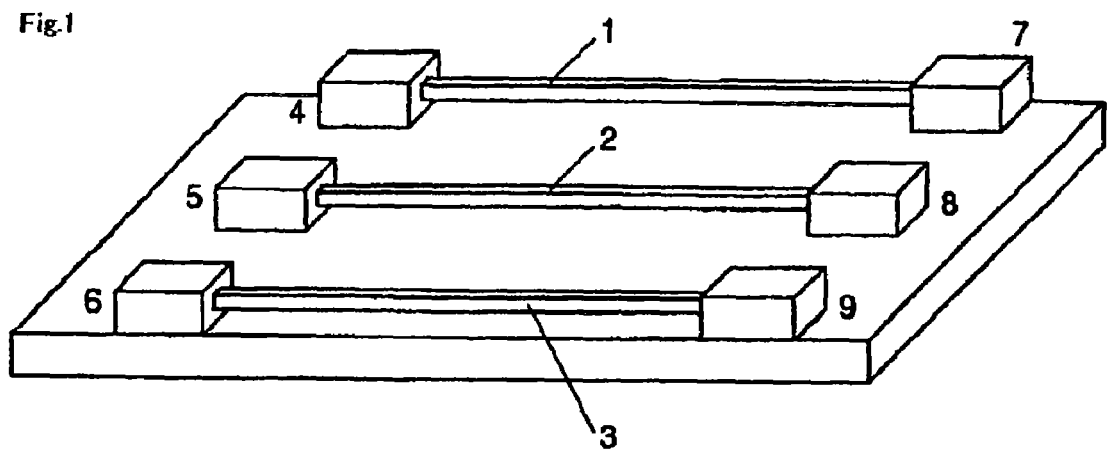
FIG. 1 is a perspective view showing a schematic structure of a switch according to embodiment 1 of the present invention.

With reference to FIGS. 1 to 3, explained is embodiment 1 of the invention. FIG. 1 depicts a schematic structural view of a switch according to embodiment 1. A first beam 1, second beam 2, third beam 3 is formed of such a shape and material as transferring an electric signal with no loss, having an insulation film with approximately 10 nm on a surface thereof. The beam 1, 2, 3 is formed, for example, of a metal, such as Al, Au, Cu or an alloy, having a shape in a both-ends-supported beam structure having a thickness 2 μm, a width 2 μm and a length 200 μm and supported at both ends. These are arranged parallel at such a spacing, e.g. of 0.6 μm, to satisfy a given isolation. The beam 1, 2, 3 is not necessarily a both-ends-supported beam structure but may be a cantilever form. Meanwhile, the beam 1, 2, 3 has a beam spring constant to be varied by changing the shape. Incidentally, the beam 1, 2, 3 is based on a structure and process to reduce its internal stress to a possible less extent, the detail of which will be referred later. The beam 1 has both ends connected with electrodes 4, 7, the beam 2 with electrodes 5, 8, and the beam 3 with electrodes 6, 9.

Figure 2A:
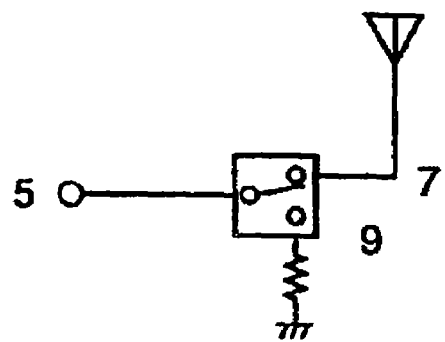
Figure 2B:
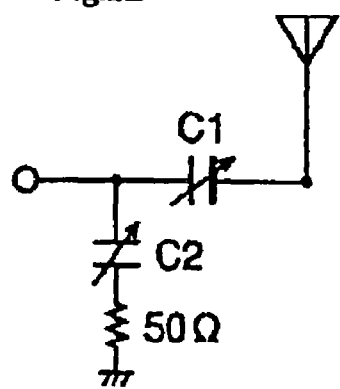
FIG. 2B is an equivalent circuit diagram of the same switch.

In order for easy explaining, explanation is made on an example that the electrode 5 is taken as an input terminal to be applied by an input signal, the electrode 7 is taken as an output terminal connected to an antenna end, and the electrode 9 is terminated at 50 Ω. FIG. 2A shows a connection circuit while FIG. 2B shows an equivalent circuit thereof.

In following explanation, "switched on" means a state of placing the electrode 5 and the electrode 7 into contact in FIG. 2A, and "switched off" means a state of isolating the electrode 5 and the electrode 7 and placing the electrode 5 and the electrode 9 into contact. According to the circuits shown in FIGS. 2A and 2B, no reflected wave is generated when switched off, because the circuits are terminated at 50 Ω. In addition, the impedance of the capacity $c_1$ becomes large and the impedance of the capacity $c_2$ becomes small when switched off, so that the signal from the input terminal is grounded through the capacity $C_2$ and the 50 Ω resistor. As a result, the isolation becomes large between the electrode 7 and the electrode 5. In this case, it is preferable to insert capacitors between the input signal source and input terminal electrode 5, and antenna and output terminal electrode 7. The 50 Ω resistor may be omittable for enhancing isolation between the electrode 7 and the electrode 5.

In this configuration, no reflection wavestake place as viewed from the input terminal. Furthermore, when the switch is OFF, isolation is to be taken great at between the electrode 7, as an antenna end, and the electrode 5, as an input terminal. In this case, capacitances may be disposed at between the electrode 5, as an input signal source and the input terminal, or input terminal, and between the electrode 7, or output terminal, and the antenna end, as required.

Incidentally, connecting the electrode 9 to another output terminal instead of termination, it is possible to realize a distribution switch having 1 input and 2 outputs. Otherwise, in case the electrode 5 is taken as an output terminal and the electrodes 7 and 9 as input terminals from the antenna, a selector switch can be made having 1 output versus 2 antenna inputs.

Now, switch operation is explained with using FIGS. 3A to 3F. FIG. 3A shows a state that no voltages are applied to the electrodes 4–9 of the FIG. 1 switch. In order to couple a signal from the input terminal to the antenna end, in FIG. 3B, the direct current potential by a control voltage source 10 connected to the electrode 4 is set at a predetermined response time High. Similarly, the direct current potential of a control voltage source 11 connected to the terminal 5 and the direct current potential by a control voltage source 12 connected to the terminal 6 are set at a predetermined response time Low. Due to this, an electrostatic force is caused between the beam 1 and the beam 2. The beam 1 and the beam 2 are attracted into contact with each other.

At this time, in case the beam 1 and the beam 2 are in the same form with a same spring constant and mass, the beam 1 and the beam 2 are placed in contact at a halfway point.

In this case, as compared to the case that either one of the beams 1, 2 is provided as a fixed electrode, because the distance change amount between the beams 1, 2 under the same electromagnetic force is twice the amount. Response is possible at higher speed. With the same response time, control is possible at lower voltage. For example, in case the electrode 4 is given a direct current potential 7.25 V, response time can be 5 $\mu$S or less. However, in the case it is movable only at one end, response time is 7.4 $\mu$S, i.e. a response time is longer approximately 1.5 times. In this case, in order to reduce a response time down to 5 $\mu$S, application voltage must be at 10.3 V.

When the beam 1 and the beam 2 come into contact, the alternating current signal inputted at the electrode 5, or input terminal, is transferred from the beam 2 to the beam 1 by a capacitive coupling through the insulation film provided on the surface of the beam 1, 2, thus being outputted onto the electrode 7, or output terminal.

In the state of FIG. 3B, in case the direct current potential by the control voltage source 12 connected to the electrode 6 of the beam 3 is rendered High, an electrostatic force occurs at between the beam 3 and the beam 2. Thus, the beam 3 moves in a direction toward the beam 2, as shown in FIG. 3C. At this time, the beams 1, 2 also move in a direction toward the beam 3. However, because the beams 1, 2, coupled two in the number, they are great in equivalent spring constant, moving amount is small as compared to that of the beam 3. However, it is noted that the direct current potential to be applied to the electrode 6 is at a voltage not to pull-in the beam 3 or smaller. Under the foregoing condition, the pull-in voltage is approximately 6.7 V. If a voltage less than that is applied, the beam 3 has a maximum displacing amount of nearly 0.15 $\mu$m, and the beams 2, 3 have a maximum gap of 0.75 $\mu$m. Because electrostatic force is inversely proportional to a square of distance, the electrostatic force caused between the beams 3 and 2 is 1.4 times as great as that of the case the beam 3 is not moved.

Incidentally, instead of applying a direct current potential to the electrode 6 in the state of FIG. 3B, the direct current potentials on the electrodes 4 and 5 may be instantaneously reversed to each other. By doing so, an electrostatic force can be caused between the beams 2 and 3 without newly applying a direct current potential by the control voltage source 12. In this case, there is no possibility of causing pull-in because of a great gap at between beams 2 and 3.

Meanwhile, in a situation isolation is required high, in case the direct current potential by the control voltage source 12 is kept in the Low state, the beam 3 is not to move. This can maintain the state the gap between the beams 2, 3 is kept great, making it possible to decrease the electric coupling between the beams 2 and 3.

Now, explained is the operation the input signal is switched and outputted, as antenna end, from the electrode 7 to the electrode 9. In the state of FIG. 3C, the direct current potential being applied to the electrode 4 is turned from High to Low, an electrostatic force does not occur at between the beams 1 and 2. Consequently, the beam 1 and beam 2 is returned to its former position by its own spring force, as shown in FIG. 3D. At this time, because the beam 3 is previously deformed toward the beam 2, the beam 2 is strongly, rapidly moved toward the beam 3 by an electrostatic force caused between the beams 2, 3 and placed into contact with the beam 3, as shown in FIG. 3E. In the case the beam 3 is not previously deflected toward the beam 2, the maximum gap is 0.9 $\mu$m. This requires a higher voltage to be applied in shortening the response time.

When the beam 2 and the beam 3 come into contact, the alternating current signal inputted at the electrode 5 is transferred from the beam 2 to the beam 3 by a capacitive coupling through the insulation film formed on the surface of the beams 2 and 3, thus being outputted onto the electrode 9. By connecting the beams 2 and 3 when switched off, C2 is short-circuited and c1 becomes hard to transmit signals in FIG. 2B, so that higher isolation is obtained between the electrode 7 and the electrode 5.

When the beam 3 is not bended previously towards the beam 2, maximum gap between the beams 2 and 3 becomes about 0.9 $\mu$m, it is necessary to supply high control voltage to the beam 2 for operating the switch within desired short response time.

Incidentally, in the state of FIG. 3E, a direct current potential is further applied to the electrode 4 similarly to the case of FIG. 3C to thereby apply an electrostatic force at between the beams 1 and 2, the beam 1 deflects toward the beam 2 as in FIG. 3F, enabling to reduce the maximum gap.

By the switch operation as above, the beam 2 applied by a signal in ON and OFF states is always in contact with the other beam 1 or 3, i.e. in a latched state. Due to this, should a great power signal be inputted to the beam 2, the beam 2 unless being latched is possibly attracted due to an electrostatic force of the signal itself by the beam 1 or 3. However, because of always latched by the beam 1 or 3, the beam 2 can be prevented from malfunctioning.

Although the above explained the case that the beams 1, 2, 3 are to move horizontally due to an electrostatic force, the beams 1, 2, 3 may be arranged in a vertical direction and to be moved vertically. Meanwhile, electrostatic force is used in a driving force, electromagnetic force, piezoelectricity or heat may be used instead. Besides in air, the beams 1, 2, 3 may be operated in vacuum or in an inert gas.

Now, explained is one process example to manufacture a switch of FIG. 1, with using a process sectional view of FIG. 4. In FIG. 4A, when a high resistive silicon substrate 41 is thermally oxidized, a silicon oxide film 42 is formed in a thickness of approximately 300 nm on the substrate 41. A silicon nitride film 43 is deposited over that with a film thickness of 200 nm, by a lowpressure CVD process. Furthermore, a silicon oxide film 44 is deposited on that with a film thickness of 50 nm, by a low pressure CVD process.

Then, in FIG. 4B, a sacrificial layer of photoresist is spin-coated with a film thickness of 2 $\mu$m over the silicon oxide film 44. After exposure to light and development, baking is carried out on a hot plate at 140° C. for 10 minutes, thereby forming a sacrificial layer 45.

Thereafter, as shown in FIG. 4C, an Al layer 46 is deposited with a film thickness of 2 $\mu$m over the entire substrate surface, by sputtering. Thus, a photoresist pattern 47 is formed leaving the resist in a predetermined area.

Next, as shown in FIG. 4D, the photoresist pattern 47 is used as a mask, to carry out dry etching on the Al layer 46 thereby forming a beam 48. Furthermore, an oxide plasma process is carried out to remove the photoresist pattern 47 and sacrificial layer 45. By the above process, formed is the beam 48 having a gap 49 to a surface of the substrate 41.

Furthermore, as shown in FIG. 4E, a silicon nitride film 50 is deposited with a film thickness of 50 nm on the entire surface of beam 48 and over the silicon oxide film 44 on the substrate surface, by a plasma CVD. Thereupon, a silicon nitride film 50 is formed over the silicon oxide film 44 on the substrate surface and on the periphery of the beam 48.

Finally, as shown in FIG. 4F, etching back is made on the silicon nitride film 43 by a dry etching process having anisotropy, under the condition of a selective ratio of a film thickness greater than the foregoing deposition film thickness, e.g. 100 nm, to the silicon oxide film 44. Etching is made not to have the silicon nitride film 50 on an upper surface but leave the silicon nitride film 50 at only a side surface, thus forming a beam 51.

Incidentally, although this embodiment used the high resistive silicon substrate 41, a usual silicon substrate, compound semiconductor substrate or insulation-material substrate may be used alternatively.

Also, although a silicon oxide film 42, a silicon nitride film 43 and a silicon oxide film 44 were formed as insulation films on the high resistive silicon substrate 41, these insulation films may be omittedly formed where substrate resistance is sufficiently high. Meanwhile, on the silicon substrate was formed an insulation film in a three-layered structure having a silicon oxide film 42, a silicon nitride film 43 and a silicon oxide film 44. However, in the case the silicon nitride film 43 has a film thickness sufficiently greater as compared to a silicon nitride film deposited on the beam, i.e. a film thickness not to vanish even through so-called an etch-back process, it is possible to omit the forming process for a silicon oxide film 44.

Incidentally, this embodiment used Al as a material for forming the beam. Alternatively used may be another metal material, e.g. Mo. Ti, Au or Cu, a semiconductor material such as amorphous silicon introduced with an impurity with concentration, or a polymer material having conductivity. Furthermore, although sputtering was used as a film forming process, forming may be by using a CVD technique, a plating technique or the like.

2. Second Exemplary Embodiment

Figure 5:
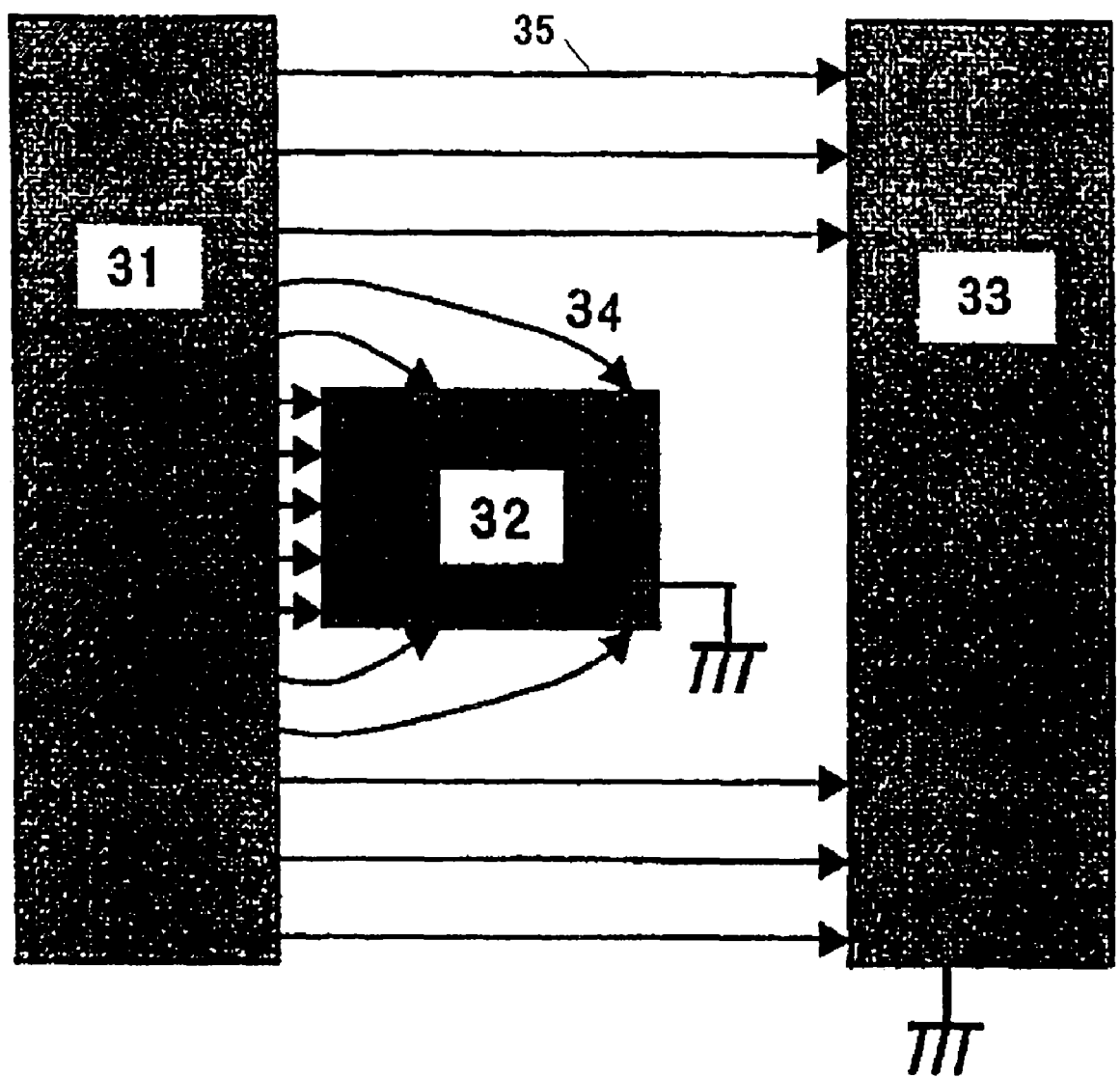
FIG. 5 is an essential-part sectional view of a switch according to embodiment 2 of the invention.

Now a second embodiment is explained while referring to FIG. 5. This embodiment is basically the same in structure as the first embodiment. However, a second beam 32 is formed smaller in thickness as compared to the first beam 31 and third beam 33, e.g. the first and third beams are formed 1.5 times greater in thickness than the second beam. In this embodiment, when the first beam 31 and the second beam 32 come into contact, an electrostatic force 35 acts between the first beam 31 and the third beam 33 in addition to an electrostatic force 34 acting between the first beam 31 and the second beam 32. With this structure, even unless a direct current potential is newly applied to the electrode 6 after a contact between the first beam 31 and the second beam 32 as was in the first embodiment, the third beam 33 is to move toward the second beam 32.

In such a case, in order for the first beam 31 to near toward the third beam 33 to a possible close extent, the second beam 32 may have an increased spring constant so that the first beam 31 and the second beam 32 can go into contact not at a halfway point but a point closer to the second beam 32.

3. Third Exemplary Embodiment

Figure 6:
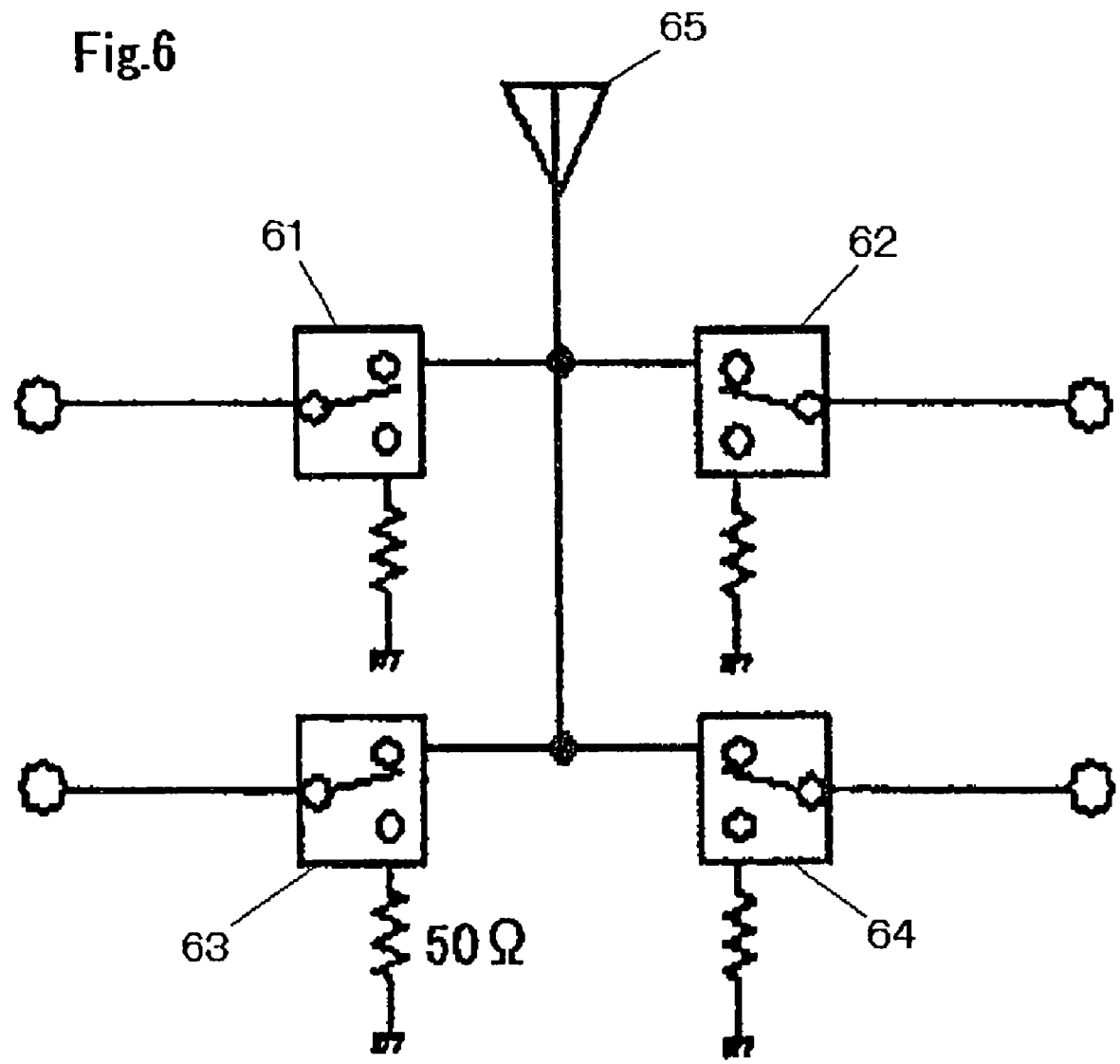
FIG. 6 is an equivalent circuit diagram of a switch according to embodiment 3 of the invention.
Figure 7:
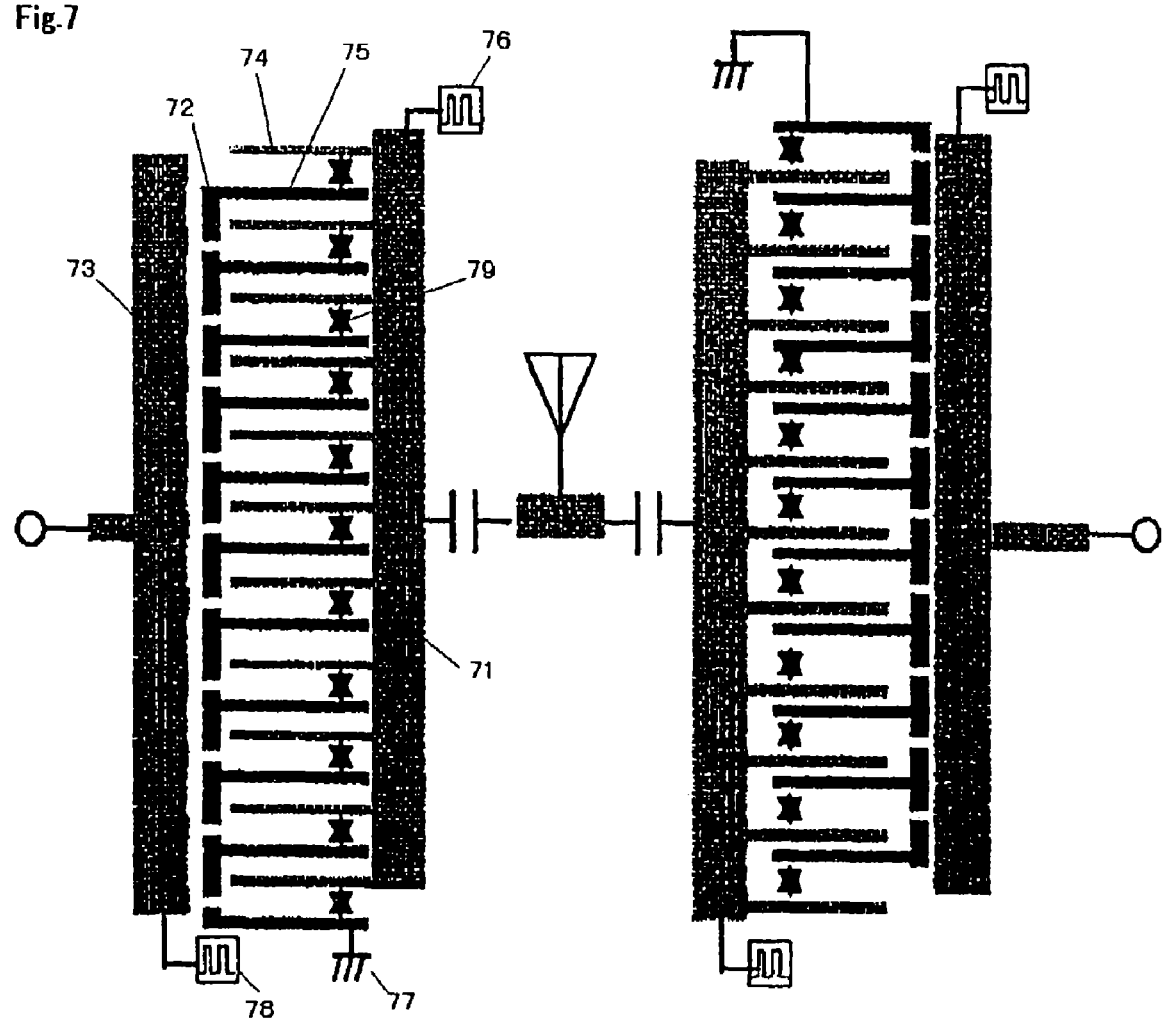
FIG. 7 is a plan view showing a schematic structure of a switch according to embodiment 3 of the invention.

Now a third embodiment is explained while referring to FIGS. 6 and 7. This embodiment has a plurality (four in FIG. 6) of FIG. 2A switch circuits symmetrically about an antenna end 65, as shown in FIG. 6. This can realize a one-input multi-output switch that can distribute an input to one antenna into a plurality of outputs and multi-output them. The switch thus structured can be configured by arraying the switches used in embodiment 1 and capacitively coupling those as shown in FIG. 7. Incidentally, FIG. 7 shows a case having two switch circuits. In FIG. 7, an electrode 71 is formed with a plurality of beams 74 in a comb form, having beams 75 between the beams 74. The beams 75 are respectively coupled with electrodes 72. An electrode 73 is provided oppositely to the electrodes 72. The electrode 71 is connected with a control voltage source 76, the electrode 72 with a control voltage source 77 and the electrode 73 is with control voltage source 78, respectively.

In case the direct current potential by the control voltage source 76 connected to the electrode 71 is provided High while the direct current potential by the control voltage source 77 connected to the electrode 72 and the direct current potential by the control voltage source 78 connected to the electrode 73 are provided Low, then a capacitive coupling 79 occurs at between the beam 74 and the beam 75 thereby effecting switch operation.

In the case a quick response time is required on the embodiment 1 switch, the moving beam must be small in mass. However, for the embodiment 3 switch for capacitive coupling, reducing a beam mass results in a reduction in the sectional area of capacitive coupling, to decrease a coupling degree and increase a passing loss. For this reason, in order to compatibly provide two reciprocal characteristics, i.e. response time and passing loss, the individual beams are made small to reduce the response time. By arraying such beams, the coupling degree is increased on the switch overall thereby satisfying the two characteristics of response time and passing loss. For example, provided that the individual beam is given a form having a width 2.5 µm by a thickness 2.5 µm by a length 380 µm, 5 sets of switches in parallel arrangement provides a preferred passing characteristic at an alternating current signal frequency of 5 GHz.

This embodiment has a frequency characteristic because of capacitive coupling. Provided that the switch capacitance on a series-connection side shown in the equivalent circuit of FIG. 2B is $C_1$ and the capacitance on a grounding side is $C_2$, impedance Z is to be expressed as Equation 1. $C_1$ and $C_2$ use the switch having basically the same configuration. The relationship between $C_1$ and $C_2$ is expressed as Equation 2. $\alpha$ represents a change ratio of capacitance, which is a ratio of a beam-to-beam gap and an insulation film thickness as it is.

$$Z = \left| \frac{\omega C_1}{1 - \omega^2 C_1 C_1} \right| \qquad \text{EQ 1}$$

$$C_2 = \alpha \, C_1 \qquad \text{EQ 2}$$

In case $\alpha$ is taken great, drive voltage is increased to increase response time. Accordingly, it cannot be taken so great. For example, in the case an insulation film is 10 nm and a gap is 0.6 µm, $\alpha$ is given 60.

In order to secure isolation, the condition that impedance takes a maximum is shown by Equation 3. Provided that $\alpha$ is 60 and application frequency is 5 GHz, $C_1$ is 4.2 pF. If this is replaced into a form of beam, it is satisfactory to use five sets of beams each having a thickness 2.5 µm by a width 2.5 µm by a length 380 µm.

$$C_1 = \sqrt{\frac{1}{\alpha \omega^2}} \qquad \text{EQ 3}$$

Meanwhile, when handling a signal having a frequency of 1 GHz, in case the frequency is one-fifth and hence the number of application beams is given 5 times, i.e. 25 sets, a characteristic is obtained equivalent to 5 GHz, thus enabling to realize a switch not having a frequency characteristic.

According to this embodiment, a switch having a desired impedance or capacitance can be realized by arranging a plurality of switches in parallel.

4. Fourth Exemplary Embodiment

Now, embodiment 4 of the invention is explained while referring to FIGS. 8 to 12. FIG. 8A is a perspective view of a switch concerned with embodiment 4 of the invention while FIG. 8B is a plan view thereof. A first beam 81, second beam 82 and third beam 83 is both-ends-supported beam whose both ends are fixed on a substrate (not shown) by anchor parts 84, 85. These are in a thickness t1=t2=t3=2 μm by a width W1=W2=W3=2 μm by a length L=500 μm. The beam uses, as a material, Al having a Young's Modulus of 77 GPa. The beams 81, 82, 83 are arranged parallel at an interval of g=0.6 μm. Insulation layers having approximately 0.01 μm are formed on the opposed side surfaces of adjacent beams. This is sufficiently small as compared to the width of beam, having a less effect upon the mechanical characteristics of the beam. Incidentally, the insulation film may be formed either one of or both of the opposed side surfaces.

Figure 8B:
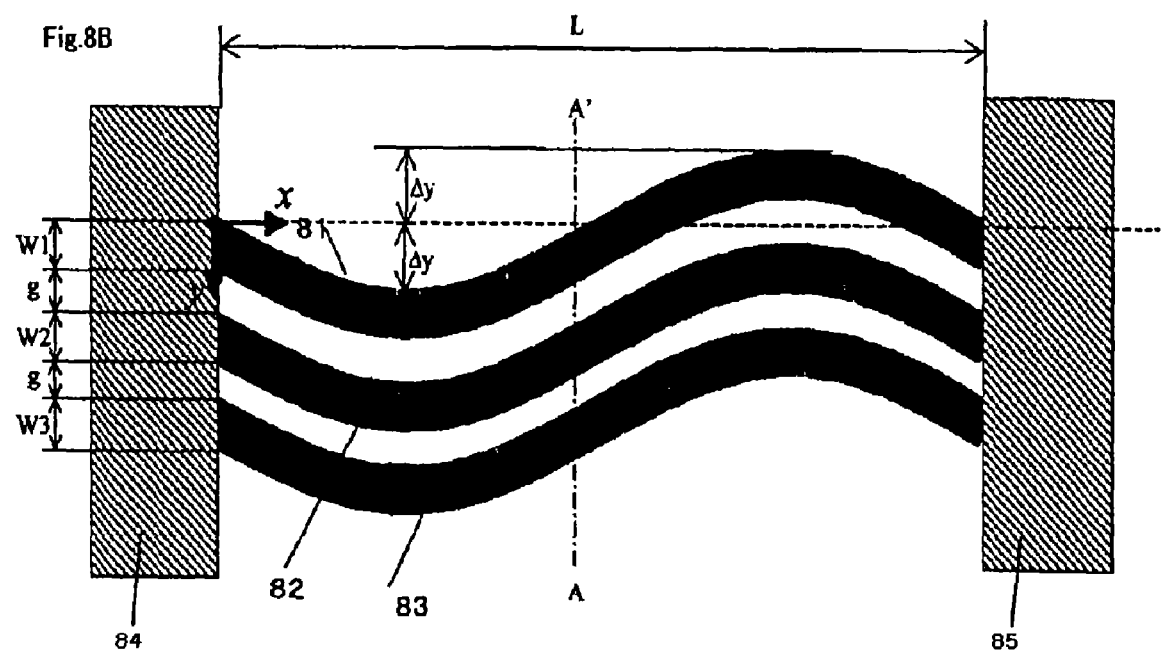
FIG. 8B is a plan view of the same switch.

As shown in FIG. 8B, the beams 81, 82, 83 are curved in an S-form as viewed at the above of the switch. The S-form is expressed by one period of a sinusoidal function of Equation 4, for example.

$$y = \Delta y \sin\left(2\pi \frac{x}{L}\right) \quad \text{EQ 4}$$

Note that, in FIG. 8B, flexure is depicted with exaggeration in order for easy understanding. On the beam, there exist an internal stress Sx in the x direction and internal stress Sy in the y direction evenly without relying upon x, y, z position. These are isotropic internal stresses, i.e. Sx=Sy=S. The beam, to be manufactured by using a semiconductor process, is formed on a sacrificial layer. In this case, although there exists an internal stress S, the stress S removed of the sacrificial layer takes a somewhat freed value.

Figure 8A:
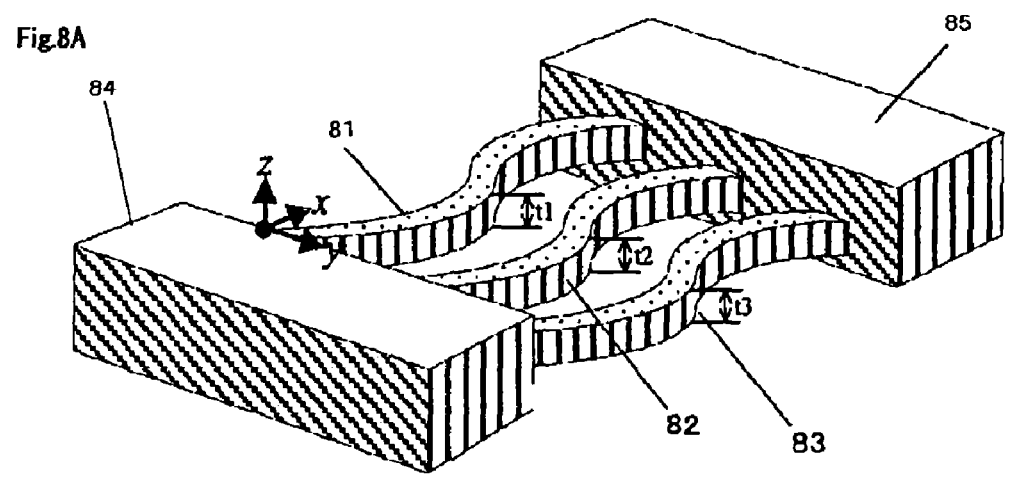
Figure 9:
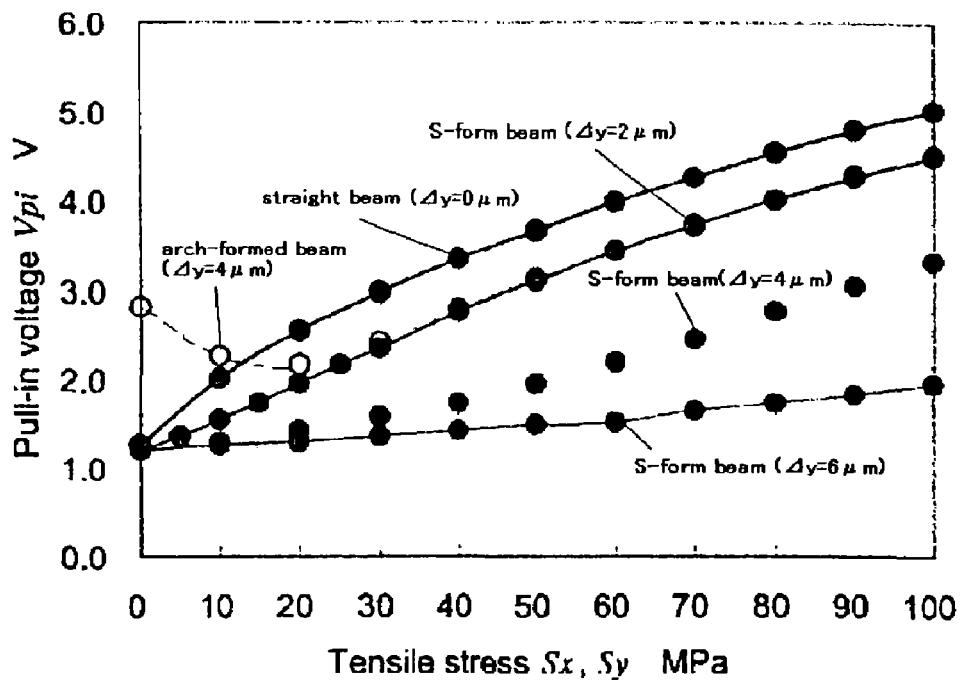
FIG. 9 is a characteristic diagram showing a relationship between a beam internal stress and a pull-in voltage of a switch according to embodiment 4 of the invention.

In the structure of FIGS. 8A and 8B, when the first beam 81 and the second beam 82 are deflected by giving a potential difference to between these, internal stress S and pull-in voltage have a relationship as shown in FIG. 9. Compared is the magnitude of flexure, i.e. the cases the Δy value in Equation 4 is 2, 4 and 6 μm. Meanwhile, shown together is a case of a straight beam structure having Δy=0, i.e. having no flexure. However, because buckling occurs under the application of a compression stress, stress S is shown within a plus range, i.e. only values of upon tensile stress. In this manner, the increase of pull-in voltage due to an increase of internal stress S can be suppressed by merely giving a flexure. This provides a greater suppressing effect as the magnitude of flexure, i.e. Δy value is increased.

Now, explained is the case of a flexure in an arch form, in order to verify the effect of S-form. The arch-formed flexure was approximated by a half period of a sinusoidal function of Equation 5. The relationship of an internal stress S and a pull-in voltage at Δy=4 μm is together shown in FIG. 9.

$$y = \Delta y \sin\left(\pi \frac{x}{L}\right) \quad \text{EQ 5}$$

Apparently, an arch form at S=0–30 MPa is greater in pull-in voltage than an S-form having Δy=2 μm, wherein they soon go near in a region of 30 MPa or greater. In a range of S=0–10 MPa, it has a greater pull-in voltage rather than the straight beam. Nevertheless, because pull-in voltage is nearly constant at around S=20±10 MPa, the variation in pull-in voltage can be reduced if the variation in residual stress can be suppressed within that range.

Figure 10:
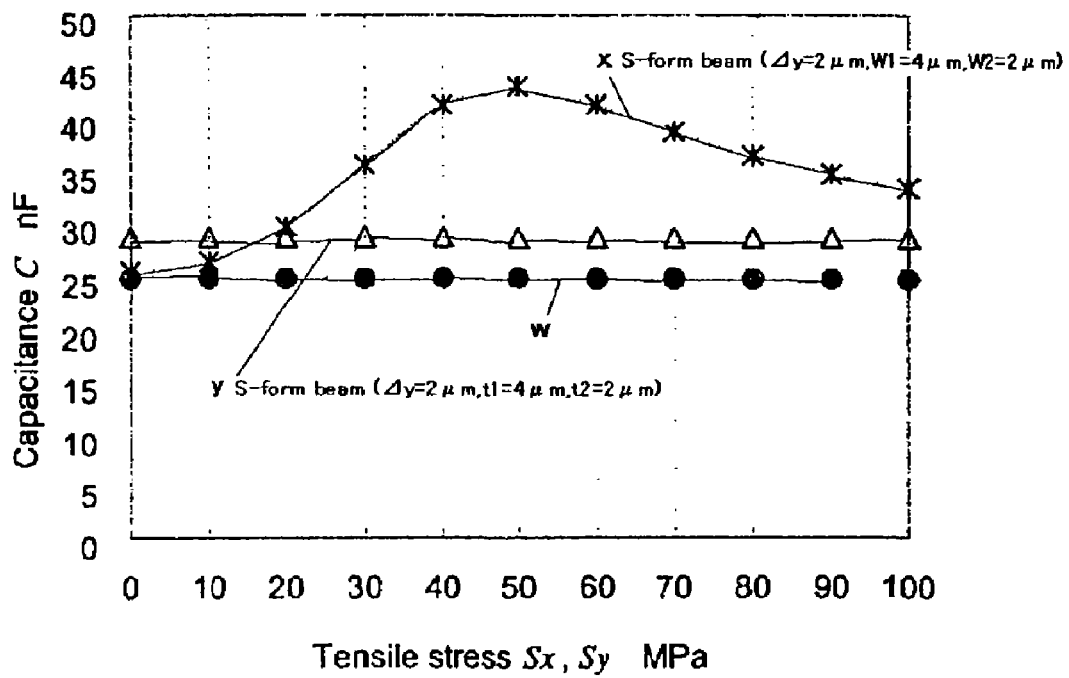
FIG. 10 is a characteristic diagram showing a relationship between a beam internal stress and a beam-to-beam capacitance of the switch according to embodiment 4 of the invention.

Next, by providing the same flexure in the adjacent beams, it is possible to suppress the capacitance change at between the adjacent beams against a deformation of the beam due to internal stress. FIG. 10 represents a relationship between an internal stress S and a capacitance at a potential difference of 0V between the adjacent beams. In case plotting is made on three S-forms (Δy=2 μm, Δy=4 μm, and Δy=6 μm) different in flexure degree and an arch-form (Δy=4 μm), it can be seen that the four are overlapped one with another as the curve-w. Accordingly, capacitance is kept nearly constant both on the arch form and S-form without undergoing the effect of internal stress. Namely, even where the beam internal stress is changed by a variation in manufacture process or by a thermal expansion due to a surrounding temperature change, electric characteristic variation can be suppressed as a capacitive coupling type switch.

Incidentally, the beams 81, 82, 83 are of the same flexure form and hence the same mechanical springiness. In case a potential difference is given, for example, between the beams 81, 82, the both displace the same amount into a contact at a half point in the gap between the both. For example, in order to near this contact point toward the beam 81, it is satisfactory to increase the rigidity of the beam 81. The first method is to increase the width W of the beam 81. There is shown, in FIG. 10, a curve-x (plotting with*) on a change of abeam internal stress and capacitance between the both beams when a potential difference between the beams 81, 82 is V=0 in the case of taking W1=4 μm and W2=2 μm on the S-formed beams 81, 82 having Δy=2 μm. By thus thickening the beam 81, the way of deformation due to residual strain is different from that of the beam 82, resulting in a great capacitance change between the both. The extreme form, for enhancing the rigidity of beam 81, is to make the beam 81 as a fixed electrode. However, in this case, the capacitance will change furthermore due to an internal stress change.

There is, as another method for controlling the beams contact point, a method of providing a thickness t1 of the beam 81 greater than a thickness t2 of the beam 82, for example. There is shown, in FIG. 10, a curve-y (plotting with Δ) on a change of a beam internal stress and capacitance between the both beams when the potential difference between the beams 81, 82 is V=0 in the case of taking t1=4 μm and t2=2 μm. Unlike from the method to increase the width, thickness increase apparently obtains an effect to keep capacitance nearly constant without undergoing the affection of internal stress.

Figure 11:
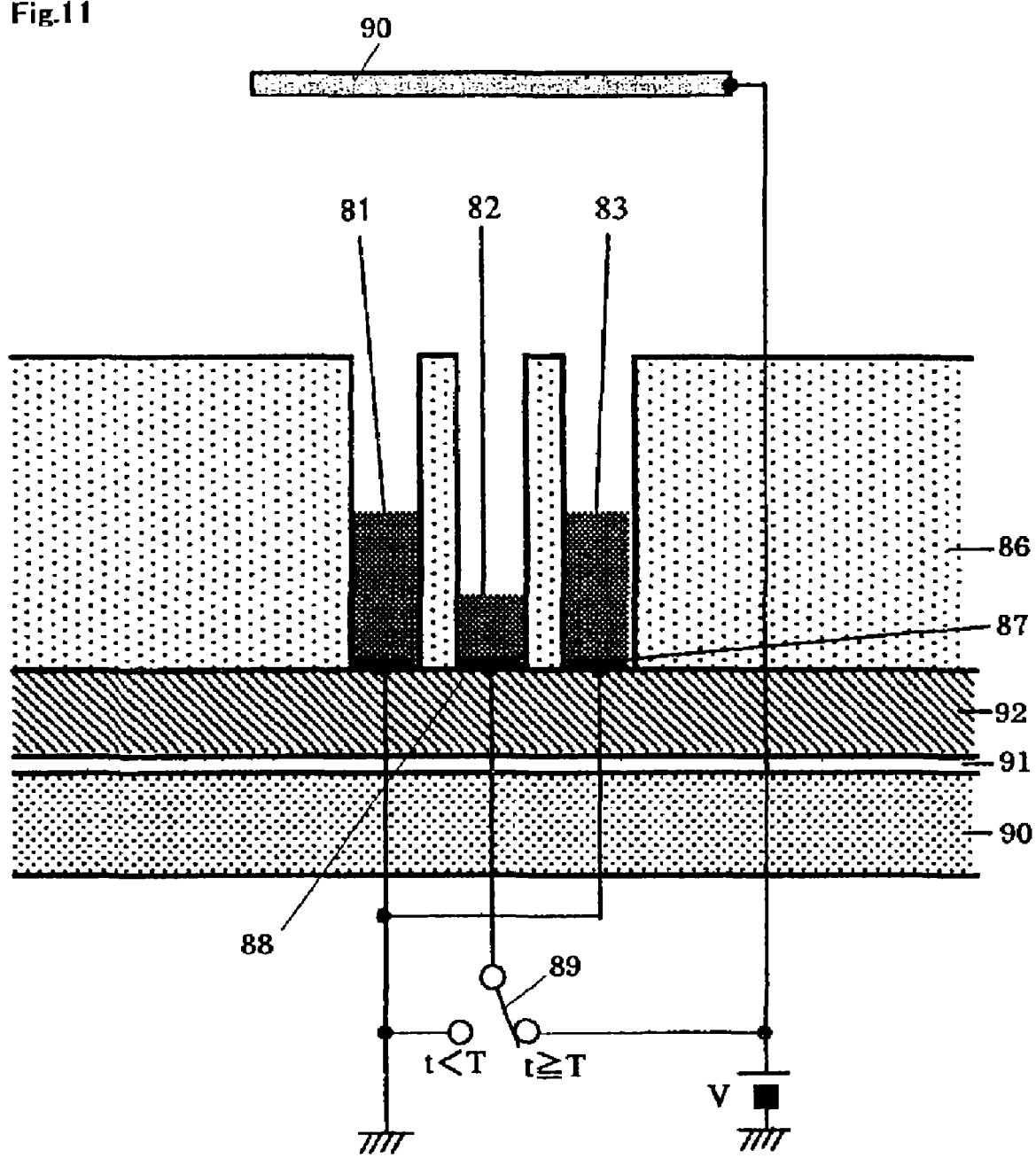
FIG. 11 is a sectional view explaining one example of a manufacturing method for a switch of embodiment 4 of the invention.

FIG. 11 shows one example of a method for manufacturing a switch structured as in the above. FIG. 11 is a sectional view along line A–A' in FIG. 8B, showing a state that an insulation film 91, sacrificial layer 92 and photolithography-patterned resist 86 is formed on a substrate 90, to form metal beams 81, 82, 83 between the patterned one of photoresist 86 by electroplating. The seed layer 87 for a beam 81, 83 is grounded. However, a seed layer 88 for a beam 82 is controlled by a switch 89 such that it is grounded until a time T but is made equal to an anode potential V after the time T. The anode potential V is provided by an anode electrode 93. The use of such an electroplating process forms beams 81, 82, 83 as metal layers having the same height, before the time T. However, at time T and therafter, no plating is formed on the beam 82. Thus, beams can be formed that are adjacent but different in thickness.

In this manner, by merely providing a beam forming a variable capacitance structure with a slight flexure, it is possible to suppress a characteristic change in pull-in voltage, capacitance or the like due to residual stress or thermal expansion, as causing a problem in a small-lined beam structure. Meanwhile, because the degree of flexure is, for example, approximately several μm for an electrode length L=500 μm, the resistance component of the beam itself is nearly the same as that of a straight-lined beam. Also, there is no need to provide a flexure structure besides the beam structure, and no prevention against device miniaturization. Furthermore, during a fabrication by a semiconductor thin-film process, flexure is determined by mask-rendering and hence easy to form.

The switch using a flexure structure can be broadly diverted as variable capacitive element to other devices. For example, in case the beam is made as a mechanical resonator to use resonance of its lateral vibration and beam surface treatment so that a certain kind of gas component can be enhanced in absorbability to a beam surface, beam mass varies due to gas adsorption, to vary resonant frequency. Accordingly, this can be utilized as a gas concentration sensor. In this case, if it should be structured by a resonator of a straight both-end-supported beam and adjacent fixed electrode, when the beam internal stress is changed by the variation in beam residual stress resulting from manufacture process or surrounding temperature change, problematically the resonant frequency greatly changes. However, such resonant frequency can be moderated by using adjacent movable beams having a flexure form as in embodiment 4.

Figure 12:
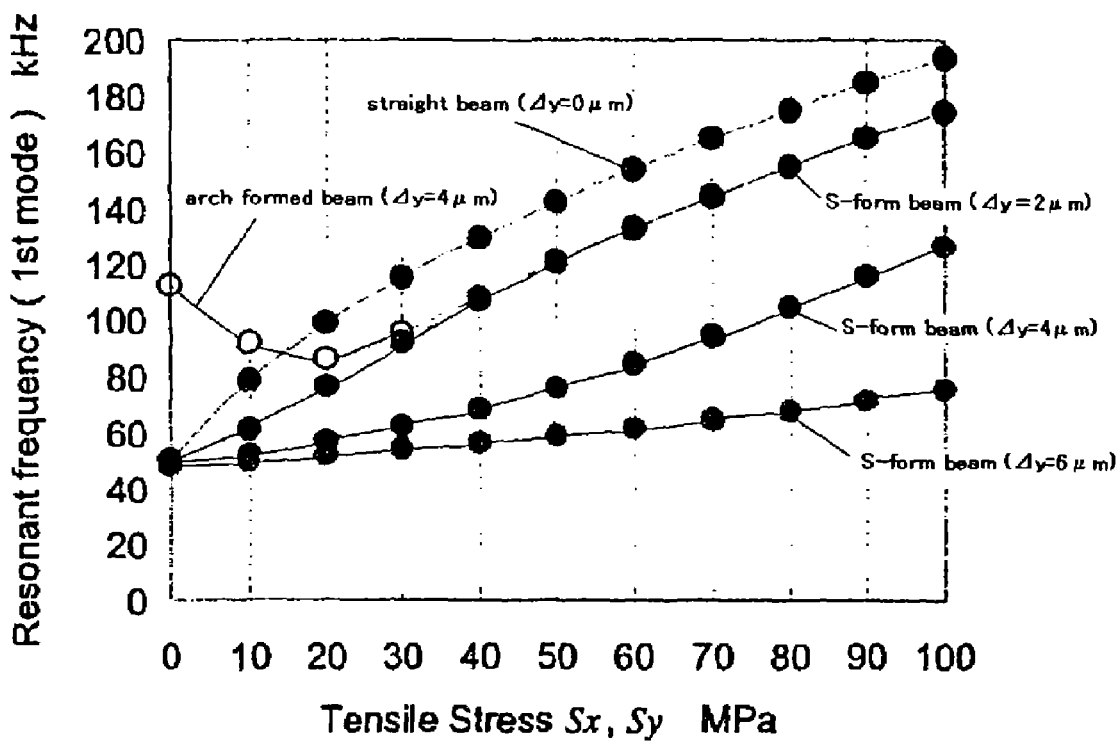
FIG. 12 is a characteristic diagram showing a relationship between a beam internal stress and a beam primary resonant frequency of the switch according to embodiment 4 of the invention.

Using a parameter representative of a flexure form of the beam shown in FIG. 9, FIG. 12 shows a relationship between an internal stress and a primary resonant frequency. There is appeared a tendency similar to the feature of the relationship between an internal stress and a pull-in voltage of FIG. 9. By increasing the curvature degree of S-form (Δy), resonant frequency change can be suppressed.

Incidentally, the foregoing embodiments explained the cases using the first, second and third of three beams, four beams or more can be comprised to structure a switch wherein three beams are for making operations according to the embodiments.

5. Fifth Exemplary Embodiment

Figure 13A:
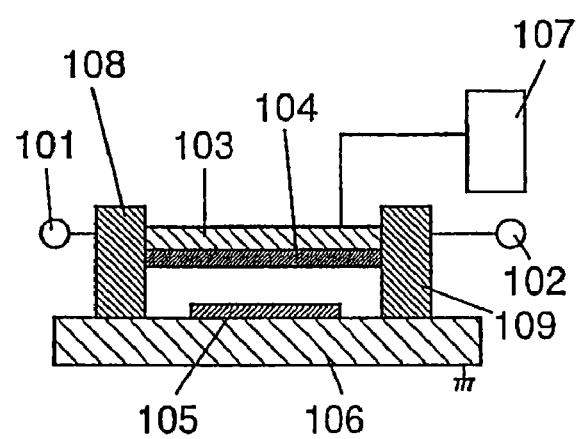
FIGS. 13A and 13B are a concept view explaining a structure and operation of a switch according to embodiment 5 of the invention.
Figure 13B:
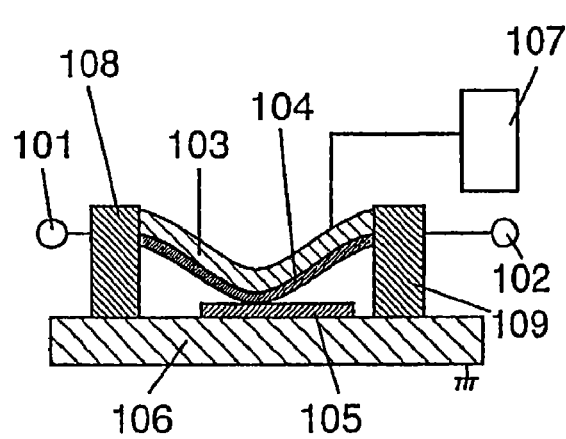

FIGS. 13A and 13B are side views showing a switch structure according to embodiment 5 of the invention. FIG. 13A is in a switch off state while FIG. 13B is in a switch on state.

Figure 14:
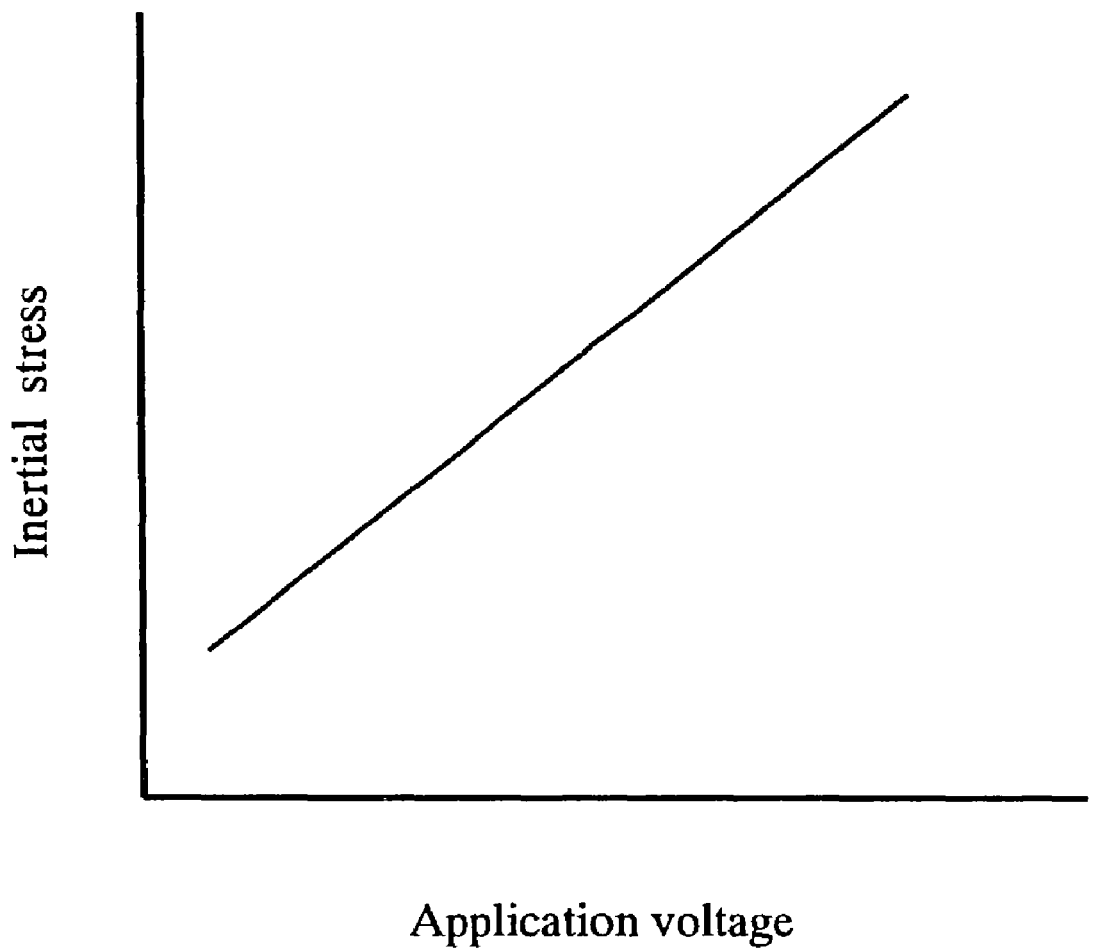
FIG. 14 is a characteristic diagram showing a relationship between a movable material application voltage and an internal stress of the switch according to embodiment 5 of the invention.

On a substrate 106, provided are a conductive pillar 108 connected to an input terminal to input a signal and a conductive pillar 109 connected to an output terminal to output a signal. A beam-structured movable electrode 104 is suspended between the pillars 108, 109. A fixed electrode 105 is arranged in an intermediate position between the pillars 108 and 109 on the substrate 106. By applying an electrostatic force between the movable electrode 104 and the fixed electrode 105, the movable electrode 104 is moved toward the fixed electrode 105. The movable electrode 104 is formed on a movable member 103. The movable member 103 is structured by an ICPF (Ionic Conducting Polymer gel Film). The ICPF has an internal stress to vary depending upon an application voltage, as shown in FIG. 14. By using this nature, the spring constant of the movable member 103 can be varied.

Figure 15:
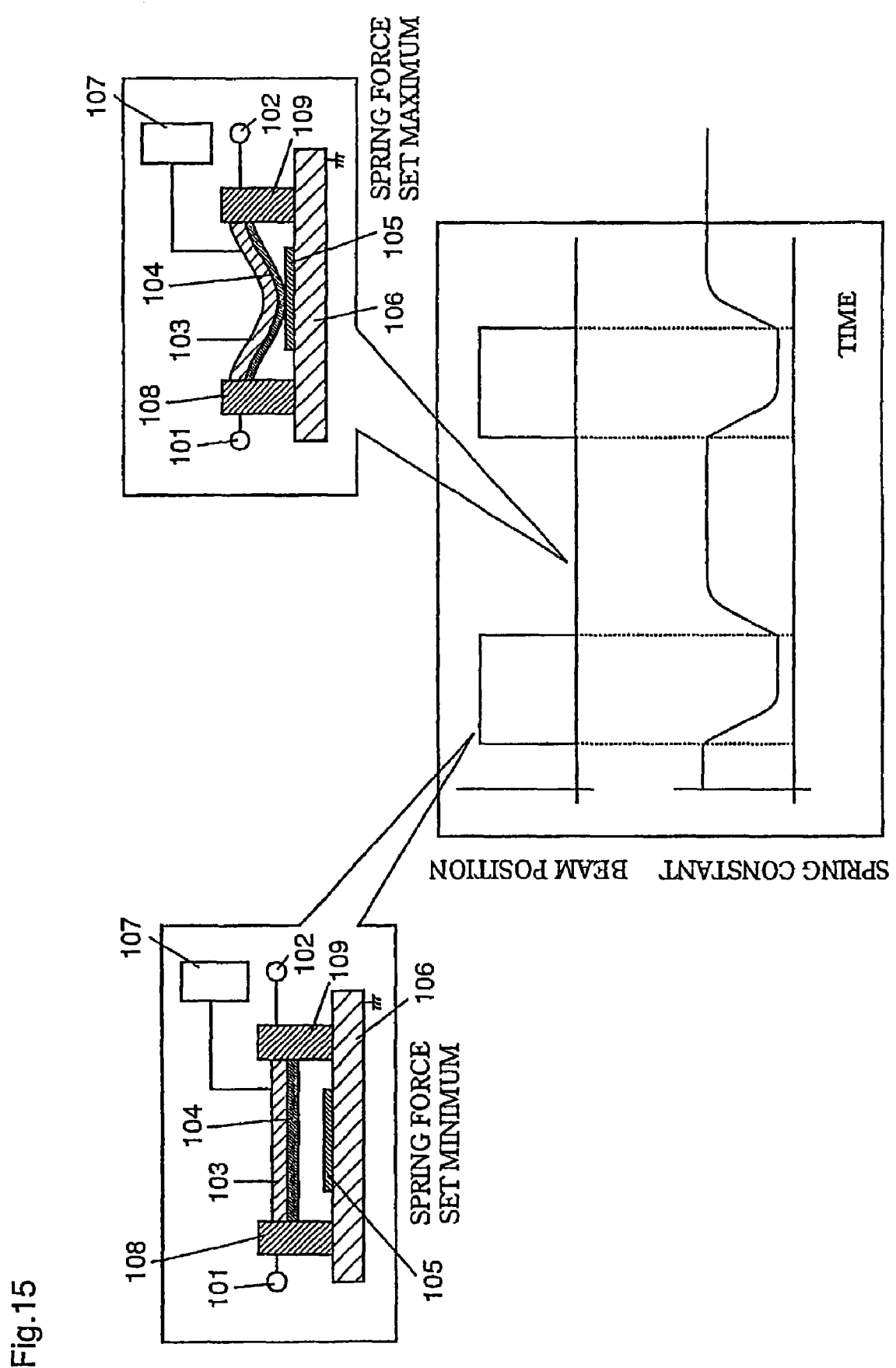
FIG. 15 is a concept view explaining a control method for a switch according to embodiment 5 of the invention.

Now, switch operation is explained with reference to FIG. 15. In FIG. 15, the upper shows a position of the movable electrode 104 while the lower shows a change of spring constant in time of the movable electrode 104. The neutral position the electrode 104 is not applied by an electrostatic force is assumably zero. When an electrostatic force is caused between the movable electrode 104 and the electrode 105 to thereby attract the movable electrode 104 toward the electrode 105, a control voltage 107 is applied to the movable member 103 such that the spring constant of the movable member 103 assumes a minimum. At this time, because the spring force is minimized, the movable member 103 and movable electrode 104 is rapidly pulled in by an electrostatic force without being interfered by the spring force.

Next, when the movable electrode 104 is detached from the electrode 105, such a voltage as maximizing the ICPF spring force is previously applied to the movable member 103 by a control voltage 107, thus maximizing the spring force. By putting the electrostatic force off between the movable electrode 104 and the fixed electrode 105, the movable member 103 and movable electrode 104 rapidly returns to a predetermined position by the spring force.

Because polymeric gel generally has a response time of approximately several ms to a control signal, expanding/contracting a polymeric gel cannot be used as a drive force for a switch requiring high-speed response. There is a sufficient response time in changing the spring force of the movable member 103 into a state the switch is held. In this manner, high-speed response is made feasible by making the spring force of the movable member 103 to optimal values respectively upon pulling in and out.

The material used for the movable member 103 may be, besides ICPF, a material that the physical value is to vary depending upon external control, e.g. a polymeric gel or piezoelectric material for use in artificial muscle. Meanwhile, in case the movable member is formed of a conductive material, the movable electrode 104 and the electrode 105 can be formed in one body.

As in the above, the switch of the invention has an effect that response time shortening and application voltage reduction can be realized by making three beams all movable. Furthermore, in case adaptively selecting the number of using beams to provide an optimal impedance in accordance with an application frequency, there is an advantageous effect to realize a switch having no frequency characteristic. Meanwhile, the flexure structure of beams can suppress against switch characteristic change due to internal stress change.

What is claimed is:

1. A switch comprising:
   first, second and third beams movable relative to each other and arranged with constant spacing one from another, wherein the first, second and third beams are arranged horizontally, any of the first, second and third beams are to move horizantally; and
   voltage applying means for providing a direct current potential to the first, second and third beams and applying a driving force to move the first, second and third beams, respectively.

2. A switch according to claim 1, wherein, when turning on the switch, the voltage applying means generates a drive force between the first beam and the second beam thereby placing the first beam and the second beam into a contact and electric coupling while, when turning off the switch, a drive force is caused between the second beam and the third beam thereby isolating between the first beam and the second beam.

3. A switch according to claim 1, wherein the first, second and third beams are arranged with a spacing satisfying a predetermined isolation.

4. A switch according to claim 2, wherein the voltage applying means is to apply a direct current potential to the first, second and third beams for a predetermined time.

5. A switch according to claim 2, wherein the third beam is moved after electric coupling between the first beam and the second beam.

6. A switch according to claim 1, wherein the beam is changed in a spring constant by changing a shape of the beam.

7. A switch according to claim 1, wherein the second beam is made smaller in shape as compared to the first and third beams.

8. A switch according to claim 2, wherein the second beam is made smaller in shape as compared to the first and third beams, and, in a state the first and second beams are electrically coupled together, the third beam is applied by a drive force from the first beam and the third beam is moved toward the first and second beams.

9. A switch according to claim 2, wherein, when the first and second beams are electrically coupled together, the first beam and the second beam are switched in potential each other, to cause a drive force on the third beam.

10. A switch according to claim 2, wherein a drive force is not caused on the third beam and the third beam is not moved.

11. A switch according to claim 1, wherein the first beam is connected to an antenna end, the second beam is connected to an input terminal and the third beam is terminated at a predetermined resistance value.

12. A switch according to claim 2, when turning off the switch, said second beam and the third beam are previously placed in contact.

13. A switch comprising a group of switches, said group of switches is formed by arranging a plurality of switches according to claim 1 in parallel.

14. A switch according to claim 1, wherein any of the first, second and third beams is formed of a metal.

15. A switch according to claim 1, wherein the first, second and third beams are arranged vertically, any of the first, second and third beams are to move vertically.

16. A switch according to claim 11, wherein capacitances are arranged between the first beam and the antenna end and between the second beam and the input terminal.

17. A switch according to claim 1, wherein the switch is to be operated in a vacuum or in an inert gas.

18. A switch according to claim 13, wherein said group of switches is formed by arranging a plurality of switches in the number symmetrically about the antenna end.

19. A switch according to claim 1, wherein adjacent two or three of the first, second and third beams are bent in a same shape.

20. A switch according to claim 19, wherein any of the first, second and third beams is made in an S-form.

21. A switch according to claim 19, wherein any of the first, second and third beams is different in thickness from an adjacent one thereof.

22. A switch according to claim 1, wherein the drive force is an electrostatic force.

23. A switch according to claim 1, wherein the switch is formed by a semiconductor process.

* * * * *